United States Patent
Rylander

(10) Patent No.: US 8,408,149 B2
(45) Date of Patent: Apr. 2, 2013

(54) GROUND WORKING MACHINE WITH A BLOCKAGE CLEARING SYSTEM AND METHOD OF OPERATION

(75) Inventor: David J. Rylander, Victoria, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/112,262

(22) Filed: May 20, 2011

(65) Prior Publication Data

US 2012/0291680 A1    Nov. 22, 2012

(51) Int. Cl.
*A01B 21/02* (2006.01)
*A01B 41/06* (2006.01)
*A01B 49/04* (2006.01)
*A01B 63/00* (2006.01)
*A01C 15/00* (2006.01)

(52) U.S. Cl. ............ 111/140; 111/200; 111/903; 172/2; 172/540; 172/664; 172/668; 172/776; 701/50; 340/936

(58) Field of Classification Search .................. 111/143, 111/139, 140, 14, 157, 163, 167, 168, 52, 111/59, 62, 63, 65, 66, 149, 200, 903, 900; 172/551, 624.5, 705, 2, 540, 663, 664, 668, 172/518, 776; 340/933, 936; 701/50, 1, 701/37, 70, 93
See application file for complete search history.

(56) References Cited

U.S. PATENT DOCUMENTS

| | | |
|---|---|---|
| 7,673,570 B1 | 3/2010 | Bassett |
| 2011/0113996 A1 | 5/2011 | Mariman et al. |

*Primary Examiner* — Christopher J. Novosad

(57) ABSTRACT

A ground working machine having a frame, a ground engaging wheel mounted to the frame and movable between a raised position not engaging the ground and a working position engaging the ground. The ground engaging wheel, when in the working position, rotating about a wheel axis as the machine is moved over the ground. An actuator raises and lowers the ground engaging wheels. A control system includes a sensor to detect rotation of the ground engaging wheel and a controller that receives an input from the sensor. The controller commands the actuator to raise the ground engaging wheel when the sensor detects that the ground engaging wheel is not rotating.

13 Claims, 1 Drawing Sheet

GROUND WORKING MACHINE WITH A BLOCKAGE CLEARING SYSTEM AND METHOD OF OPERATION

FIELD

A ground working machine with a ground engaging wheel is described and in particular a control system to lift the ground engaging wheel in response to the wheel no longer rotating.

BACKGROUND

It is a common practice in Midwestern United States crop production to use minimum tillage or no-tillage practices that leave crop residue in the field. As a result, row cleaner wheels are commonly used planters. The row cleaner wheels clear previous crop residue and soil clods from the row unit's path to remove stubble and clear the ground. This provides a more uniform environment for placing seed in the soil and clears residue from the immediate area surrounding the seed to facilitate warming of the soil and reduce the likelihood of disease and fungi interference with the emerging seedling.

Most row cleaner wheels are configured to clear a path as wide as the row unit gauge wheels. Row cleaner wheels used in tilled soil struggle to enough traction to keep the wheels turning. Floating row cleaner wheels are often used in combination with treader wheels to gauge depth and provide extra traction to keep the cleaner wheels turning. When planting in tilled cornstalks, root balls and stalks can easily become caught in front of the row cleaner wheels and stop rotation of the wheels. The row unit then starts to push a pile of residue and soil. It only takes a few seconds for the pile to become large enough to impact the rows on either side of the plugged row. The planter must be stopped and raised and moved over the pile to clear the pile. If the operator doesn't want to leave an unplanted gap in the field, the pile of residue and soil must be manually moved aside rather than raising the planter to move over the pile. This is time consuming and reduces the planting efficiency.

SUMMARY

A ground working machine is described having a frame, a ground engaging wheel mounted to the frame and movable between a raised position not engaging the ground and a working position engaging the ground. The ground engaging wheel, when in the working position, rotates about a wheel axis as the machine is moved over the ground. A control system is provided having a sensor to detect rotation of the ground engaging wheel, a controller receiving an input from the sensor, and an actuator to raise the ground engaging wheel when the sensor detects the ground engaging wheel is not rotating.

DETAILED DESCRIPTION

Figure 1:
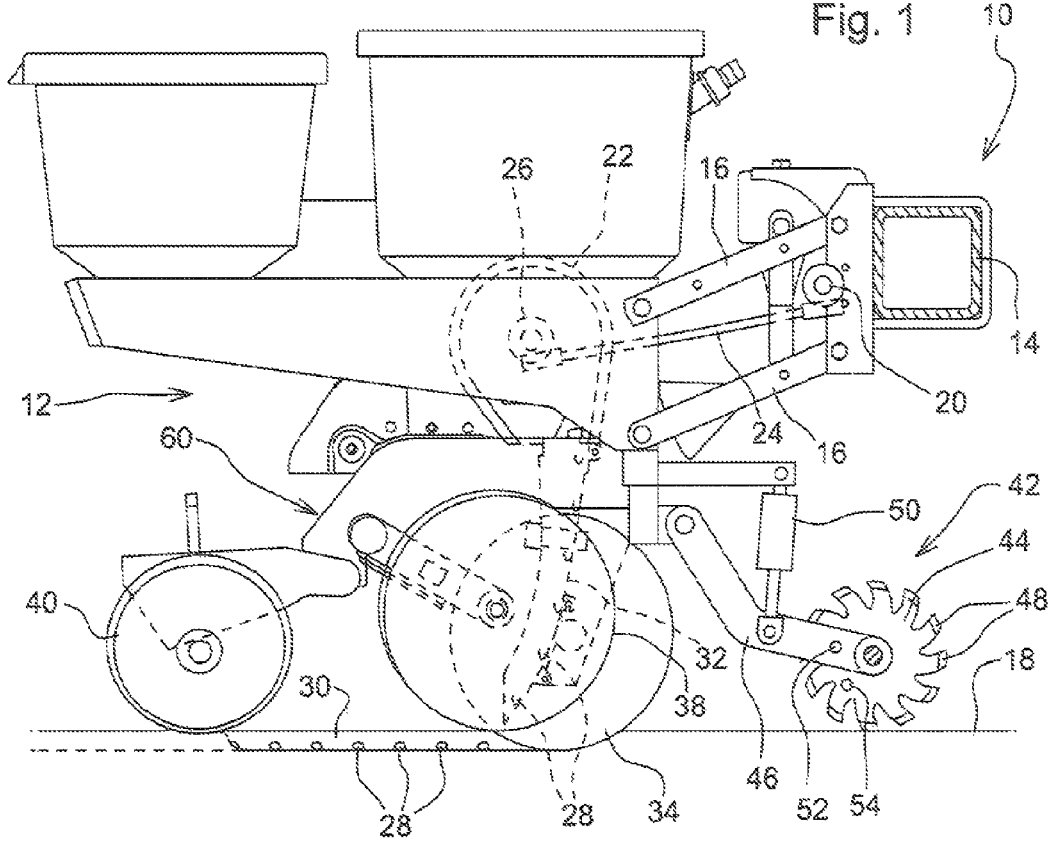
FIG. 1 is a side view of a ground working machine illustrating a row unit of the machine.

With reference to FIG. 1, one row unit 12 of a ground working machine 10 is shown. Ground working machine 10 is in the form of a seeding machine, and in particular, a row crop planter but could be any type of machine having at least one rotating wheel engaging and working the ground as the machine is moved over the ground. Machine 10 has a plurality of the individual row units 12 coupled with a transverse tool bar or frame 14. The tool bar 14 is in turn coupled to a tractor (not shown) for moving the machine in a known manner. Each row unit 12 is typically configured substantially identical to each other, and therefore, only a single row unit 12 is shown and described.

Row unit 12 is coupled with tool bar 14 through pivotal linkage elements 16, and thereby is movable in generally vertical up and down directions to follow the contour of soil 18. A planter drive includes a ground driven main shaft 20 that runs along the backside of tool bar 14 and is the source, or a primary source, of input power to each seed meter 22. A flexible drive shaft 24 couples the main shaft 20 to a transmission 26. The output of the transmission is a meter shaft of the seed meter 22. Seed meter 22 is used to space seeds 28 at an average predetermined distance from each other within seed trench 30. Seeds from the seed meter are deposited in the trench through seed tube 32.

The seed trench 30 is formed by a double disk opener 34. Gauge wheels 38 located to the sides and slightly rearward of the opening disks, control the depth to which the opener disks penetrate the soil, and thus the depth of the seed trench 30. Rearward of the gauge wheels are closing disks or wheels 40 that close the trench by placing soil on top of the seed. Forward of the opener 34 is a row cleaner 42 having a pair of cleaner wheels 44 arranged at an angle to the forward direction of travel of the machine. The cleaner wheels 44 are mounted to an arm 46 that is pivotally mounted to the row unit frame 60 at the forward end thereof. The wheels 44 as shown have a number of teeth or spikes 48 that engage the soil and rotate when the machine is moved over the soil. Each wheel 44 rotates about its own axis. The rotation of the wheels 44 causes crop residue on the soil surface to moved laterally, out of the path of the opener 34, leaving cleared soil for the opener. This facilitates accurate seed placement in the seed trench 30 and reduces the likelihood of "hairpining" where the opener pushes crop residue, such as a corn stalk, into the seed trench; creating an undesirable environment for seed. The position of the arm 46 is controlled by a linear actuator 50 that raises and lowers the arm 46 between a working position in which the wheels 44 engage the ground and a raised position in which the wheels do not engage. The actuator 50 can be a pneumatic cylinder, hydraulic cylinder, a motor actuated screw, etc. The exact form of the actuator is not critical. Some commercially available row cleaner products include the 2967 E-Series Residue Manager from Vetter Manufacturing Inc. of Colchester, Ill., the Clean Sweep available from Precision. Planting of Tremont, Ill. and the Ground Effects (Gfx) Floating Row Cleaner from Dawn Equipment Company of Sycamore, Ill. Some row cleaners are "floating", meaning that the row cleaner is not fixed to the row unit frame but is free to follow the contours of the soil. Other row cleaners have a fixed position relative to the row unit frame controlled by the linear actuator 50.

Figure 2:
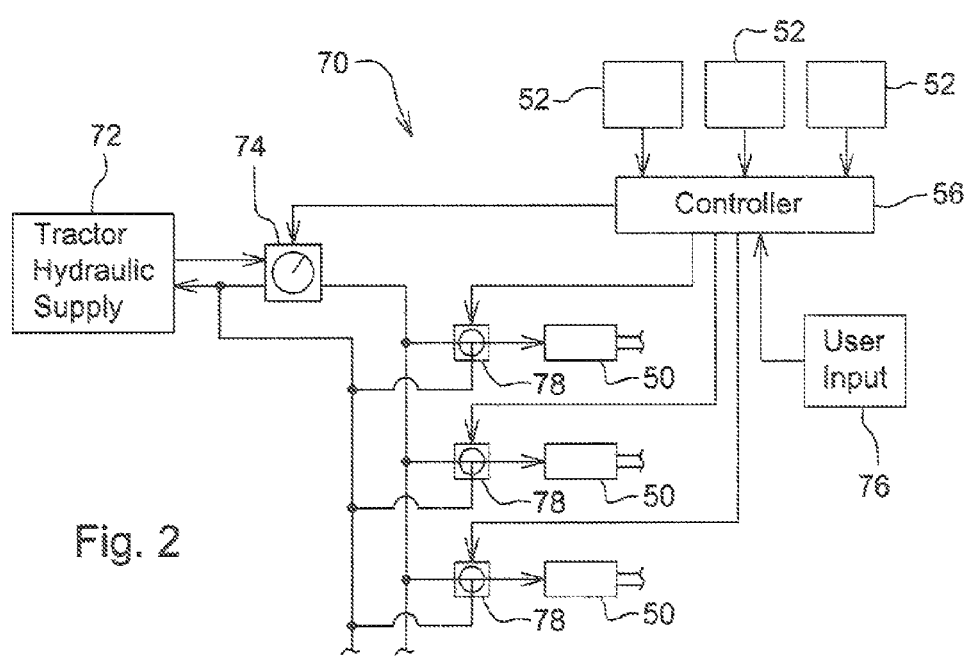
FIG. 2 is a control system for raising a ground engaging wheel of the machine in response to the ground engaging wheel no longer rotating.

In certain field conditions, crop residue, such as corn root balls and stalks, can easily become caught in the row cleaner wheels and stop rotation of the wheels. The row unit then starts to push a pile of residue and soil. It only takes a few seconds for the pile to become large enough to impact the rows on either side of the plugged row. To correct this problem, the machine must be stopped and raised and moved over the pile, to clear the pile. If the operator doesn't want to leave an unplanted gap in the field, the pile of residue and soil must be manually moved aside rather than raising the planter to move over the pile. To reduce the disruption caused by a plugged row cleaner wheel, the wheels 44 are equipped with a wheel rotation sensor 52 on the arm 46. The sensor 52 may be a magnetic sensor with a magnet 54 mounted on the cleaner wheel 44 and detected by the sensor 52 when the magnet 54 passes the sensor. The sensor 52 produces an output signal communicated to a controller 56 shown in FIG. 2. Any of a variety of sensors can be used for detecting, rotation of the cleaner wheels. These include inductive sensors, proximity sensors, optical sensors, hall effect sensors, etc. An optical sensor be mounted remotely from the wheel. In addition, a video camera can be mounted to the frame in a location to visualize cleaner wheels on multiple row units and with analysis software determine which cleaner wheel is not turning for corrective action. When the rotation sensor detects a cleaner wheels not rotating, the control system 70 shown in FIG. 2 operates to raise the stopped cleaner wheel to allow the cleaner wheel to move over the accumulated pile of crop residue. The cleaner wheel is then returned to the operating position.

In the illustrated control system 70, the linear actuator is a hydraulic cylinder with hydraulic fluid pressure supplied from a tractor hydraulic supply 72. Hydraulic pressure in the system is controlled by a valve 74 through an electric input from the controller 56. A user input 76 to the controller allows the operator to set the system pressure. Individual control valves 78 operate to supply hydraulic fluid pressure to the linear actuators 50. Actuators 50 are single-acting, spring hydraulic cylinders such that when the hydraulic pressure is removed from the cylinder, the spring return retracts the actuator piston, raising the arm 46 and row cleaner wheels 44. When one of the sensors 52 detects that the associated cleaner wheel is not rotating, the controller 56 will send a signal to the associated valve 76 to release the hydraulic pressure to the actuator 50 allowing the actuator to retract and raise the cleaner wheel. After a few seconds, the machine will have moved passed the residue pile, the controller then activates the valve 78 to reapply fluid pressure to lower the row cleaner once again. The sensor and control system operate autonomously without input from the operator to clear the cleaner wheel so that it again rotates.

Those skilled in the art will recognize that the control system 70 is only one of many possible ways to clear the residue from the cleaner wheel. The actuators 50 are also one possible type of actuator. A two-way cylinder can be used with a hydraulic system that operates to both raise and lower the cleaner wheel.

In the described system, each row unit cleaner wheels are operated independently. This provides the maximum benefit in terms of clearing the plug and not interrupting the operation of the other rows of the machine. But this also adds the most cost in terms of added valves in the control system. A less costly system uses one actuator to lift multiple cleaner wheels such as a gang of cleaner wheels. A still more simply system is one that raises the entire machine when one cleaner wheel stops rotating. While this effects the entire machine and still leaves a gap in the field when the machine is lifted, it still provides the benefit of automatic detection of a plugged cleaner wheels and correction and does not rely on the operator noticing the problem before taking corrective action.

While the system has been described in the context of clearing a plugged row cleaner wheel, it will be apparent to those skilled in the art that the system can be applied to any ground engaging wheel on the machine. The wheels of the row unit can be cleared by lifting the individual wheel or by lifting the entire row unit.

The control system 70 does not need to be operating at all times but only when the machine is at work in the field. For instance, when the machine is turned at the end of the field, the machine is first raised. Once raised, the cleaner wheels will be off the ground and thus not rotating. But there is no need at this point to detect the cleaner wheels not rotating. Thus an input into the control system of machine operation state is desirable. Various ways can be used to determine if the machine is in use. One way is to detect the position of the machine tool bar 14, is the tool bar raised for end row turning or transport, or is the tool bar lowered for in field operation. The tool bar position plus an machine speed input will enable a determination of machine use. If the tool bar is lowered, but not moving, there is no need to detect rotation of the cleaning wheels. Only when the tool bar is lowered and in motion is cleaner wheel rotation necessary. Motion of the machine can be determined by a separate machine speed sensor, by changes in a GPS location determination, or by tractor engine/transmission state, etc. Any of the above methods (and others) can be used to determine when it is necessary to monitor cleaner wheel rotation.

Having described the system, it will become apparent that various modifications can be made without departing from the scope as defined in the accompanying claims.

What is claimed is:

1. A ground working machine comprising:
    a frame;
    a plurality of ground engaging cleaner wheels mounted to the frame and movable between a raised position not engaging the ground and a working position engaging the ground, individual cleaner wheels when in the working position rotating about a wheel axis as the machine is moved over the ground and configured to remove crop residue from crop rows over which the ground working machine passes;
    an actuator configured to move at least some of the ground engaging cleaner wheels between the raised and working positions; and
    a control system including a sensor to detect rotation of the ground engaging cleaner wheels, a controller receiving an input from the sensor, the controller operably connected to the actuator to effect a signal to the actuator to cause the actuator to raise the ground engaging cleaner wheels upon input from the sensor when the cleaner wheels are obstructed and the sensor detects that the ground engaging cleaner wheels are not rotating, the control system providing input to lower the cleaner wheels after the obstruction is past by the machine.

2. The ground working machine of claim 1 further comprising a motion detector effective for determining when the machine is in operation working the ground and, the motion detector effective to operate the control system to raise the ground engaging cleaner wheels when the machine is in operation.

3. The ground working machine of claim 2 wherein the control system is configured to operate to raise a portion of said ground engaging cleaner wheels together in response to one said ground engaging cleaner wheels not rotating.

4. The ground working machine of claim 1 further comprising a plurality of sensors to determine if any of said ground engaging cleaner wheels are not rotating, the control system operable to raise all of said ground engaging cleaner wheels together in response to one said ground engaging cleaner wheels not rotating.

5. The ground working machine of claim 1 wherein the control system is configured to operate to raise anyone of said ground engaging cleaner wheels independently of other said ground engaging cleaner wheels in response to that ground engaging cleaner wheels not rotating.

6. The ground working machine of claim 1 wherein the machine is a seeding machine having a plurality of row units, individual row units having a ground engaging cleaner wheel and an actuator to raise the ground engaging wheel in response to the ground engaging cleaner wheel not rotating.

7. The ground working machine of claim 6 wherein the ground engaging cleaner wheels are mounted to a respective one of the row units and wherein the actuator raises the entire row unit.

8. The ground working machine of claim 1 wherein the machine is a seeding machine having a plurality of row units, individual row units having a seed trench opener and a cleaner wheel in front of the seed trench opener wherein the sensor detects rotation of the cleaner wheel and the actuator lowers and raises the cleaner wheel.

9. The ground working machine of claim 1 further comprising a tool bar and a tool bar position detector configured to detect the position of a tool bar, the tool bar configured for coupling to a tractor and being movable between positions which correspond to operation in the field and transport of the machine when cleaner wheels are not being used.

10. A seeding machine having a front portion and back portion, the front portion configured to move in a direction of travel when pulled by a tractor, the seeding machine comprising:
   a plurality of row units, the row units including a seed trench opener and a ground engaging cleaner wheel in front of the trench opener;
   a frame coupled to the row units,
   the ground engaging cleaner wheel movable between a raised position not engaging the ground and a working position engaging the ground, individual cleaner wheels when in the working position rotating about a wheel axis as the machine is moved over the ground and the individual cleaner wheels configured to remove crop residue from crop rows which are to be seeded by the seeding machine and over which the ground working machine passes;
   an actuator which is configured to move at least some of the ground engaging cleaner wheels between the raised and working positions; and
   a control system including a sensor to detect rotation of the ground engaging cleaner wheels, a controller receiving an input from the sensor, the controller operably connected to the actuator to effect a signal to the actuator to cause the actuator to raise the ground engaging cleaner wheels upon input from the sensor when the cleaner wheels are obstructed and the sensor detects that the ground engaging cleaner wheels are not rotating, the control system configured to provide input to lower the cleaner wheels after the obstruction is past by the machine; and
   a motion detector effective for determining when the machine is in operation seeding and, the motion detector effective to operate the control system to raise the ground engaging cleaner wheels when the machine is in operation.

11. The ground working machine of claim 10 wherein further comprising a motion detector effective for determining when the machine is in operation working the ground and, the motion detector effective to operate the control system to raise the ground engaging cleaner wheels when the machine is in operation.

12. The ground working machine of claim 11 wherein the motion detector is selected from the group consisting of a speed sensor, a sensor which senses a change in position of the machine, a transition state sensor, and an engine state sensor.

13. The ground working machine of claim 11 further comprising a tool bar and a tool bar position detector configured to detect the position of a tool bar, the tool bar configured for coupling to a tractor and being movable between positions which correspond to operation in the field and transport of the machine when cleaner wheels are not being used.

* * * * *